J. & M. NELSON.
STREET AND STATION INDICATOR.
APPLICATION FILED FEB. 24, 1910.
998,630.
Patented July 25, 1911.
3 SHEETS—SHEET 3.
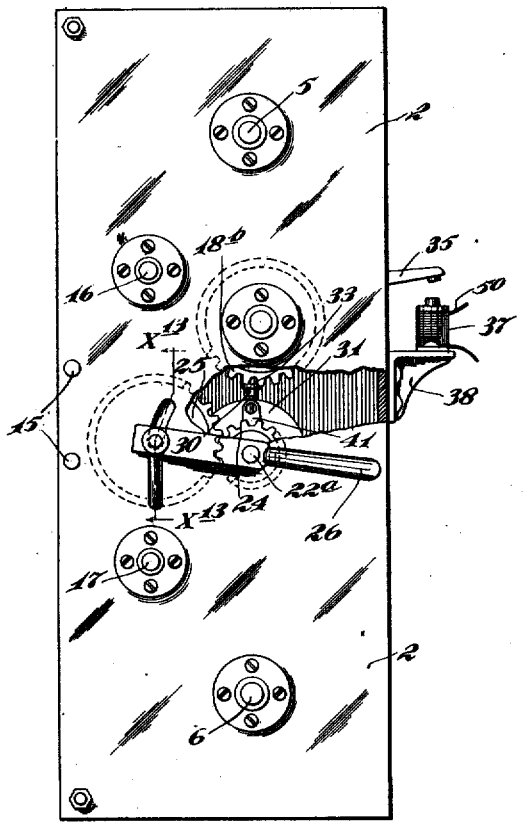
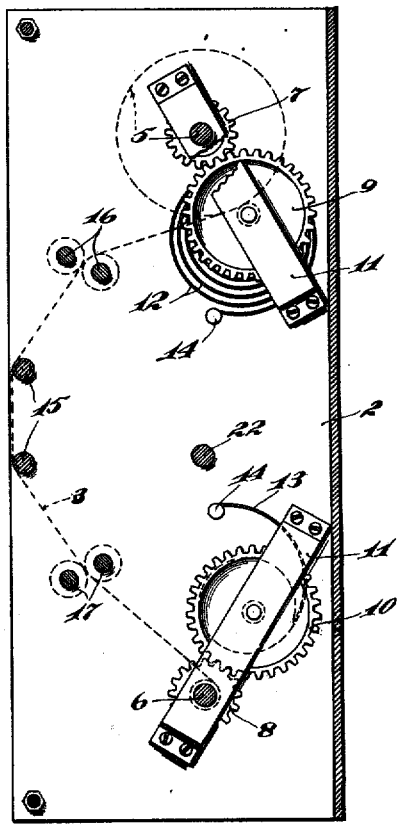
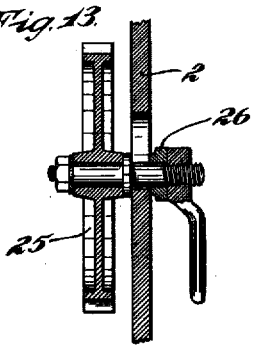

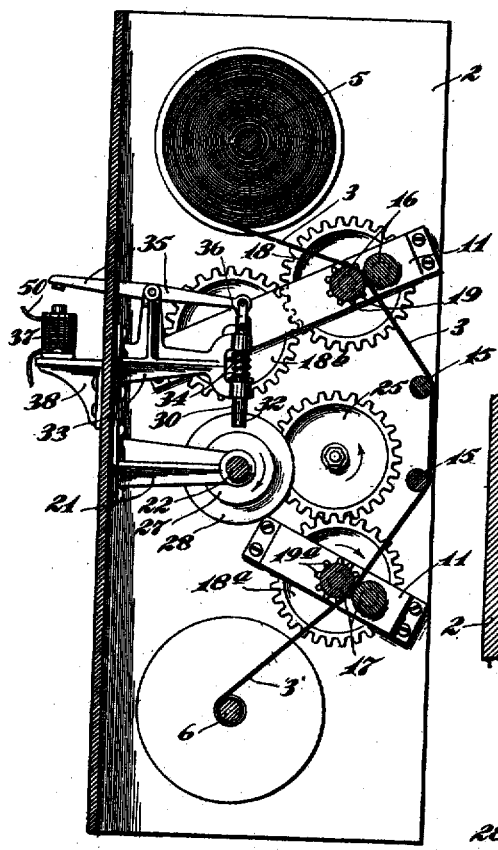

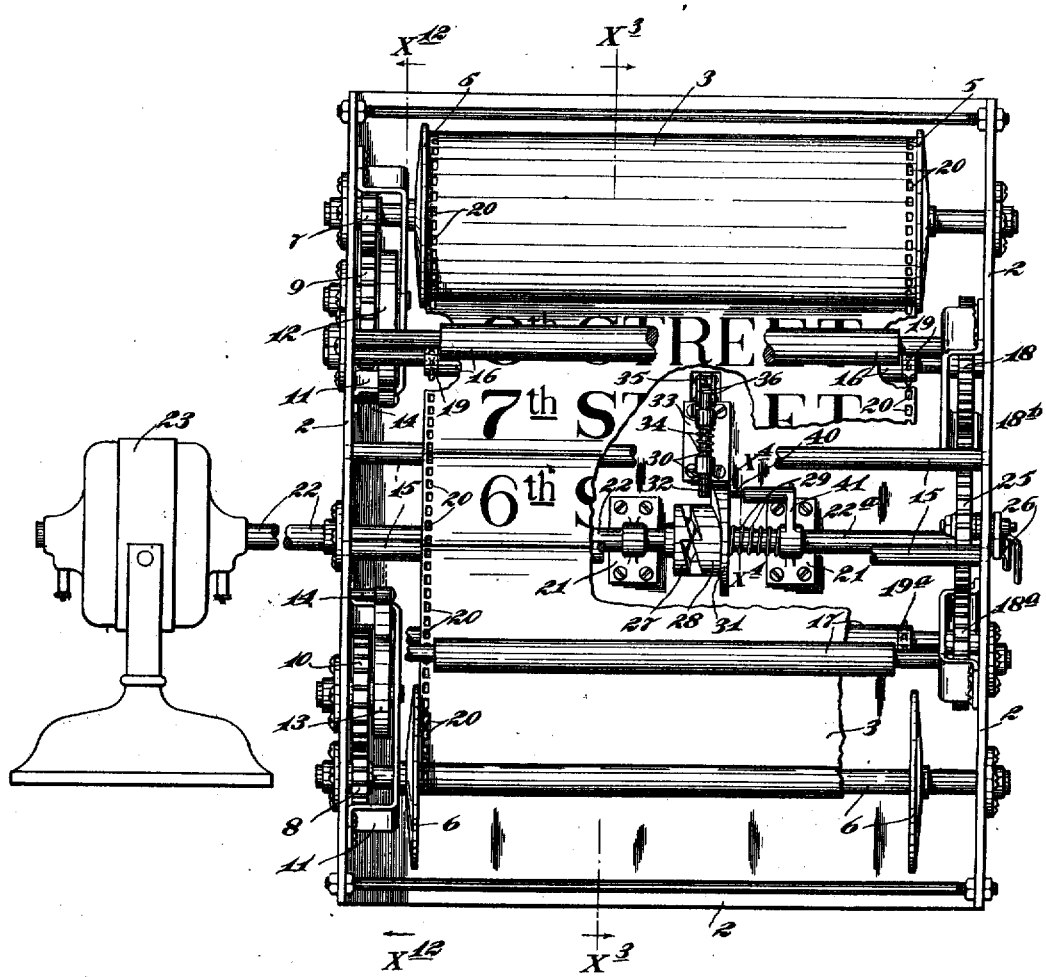

UNITED STATES PATENT OFFICE.

JULIUS NELSON AND MARCUS NELSON, OF MINNEAPOLIS, MINNESOTA.

STREET AND STATION INDICATOR.

998,630.

Specification of Letters Patent. Patented July 25, 1911.

Application filed February 24, 1910. Serial No. 545,697.

*To all whom it may concern:*

Be it known that we, JULIUS NELSON and MARCUS NELSON, citizens of the United States, residing at Minneapolis, in the county of Hennepin and State of Minnesota, have invented certain new and useful Improvements in Street and Station Indicators; and we do hereby declare the following to be a full, clear, and exact description of the invention, such as will enable others skilled in the art to which it appertains to make and use the same.

Our invention has for its object to provide an improved street or station indicator, especially adapted for use in connection with street railways and interurban electric lines.

To the above ends, the invention consists of the novel devices and combinations of devices hereinafter described and defined in the claims.

In the accompanying drawings which illustrate the invention, like characters indicate like parts throughout the several views.

Referring to the drawings, Figure 1 is a fragmentary view in section, showing the improved indicator applied to an ordinary electric car; Fig. 2 is a view in rear elevation, showing the improved indicator removed from working position, some parts being broken away; Fig. 3 is a vertical section taken on the line $x^3$ $x^3$ of Fig. 2; Fig. 4 is a detail taken in section approximately on the line $x^4$ $x^4$ of Fig. 2; Fig. 5 is a section on the line $x^5$ $x^5$ of Fig. 4; Fig. 6 is a detail showing the movable member of an intermediate clutch; Fig. 7 is a section on the line $x^7$ $x^7$ of Fig. 6; Fig. 8 is a detail view, partly in elevation and partly in section, showing a portion of the clutch tripping plunger; Fig. 9 is a detail view in side elevation, showing a portion of the car trolley, overhead wire and attachments therefor, for controlling the operation of the street indicator; Fig. 10 is a section on the line $x^{10}$ $x^{10}$ of Fig. 9; Fig. 11 is a side elevation of the indicator, some parts being broken away; Fig. 12 is a section taken on the line $x^{12}$ $x^{12}$ of Fig. 2; and Fig. 13 is a detail in section on the line $x^{13}$ $x^{13}$ of Fig. 11.

The body of the street car is indicated as an entirety by the numeral 1 in Fig. 1 and the street indicator proper is shown as applied to the front end portion thereof. The principal parts of the indicator are contained within a box or case 2, which as shown, is suitably secured to the front end portion of the car, in position to feed a street indicating ribbon 3 in front of a slot or sight opening 4 formed in a panel or to a portion of the front end of the car. This indicator ribbon 3 is marked with the different streets, and, at its upper end, it is attached to an upward winding drum 5, and, at its lower end, it is attached to a lower winding drum 6, which drums are suitably mounted in the case 2. The shafts of the said drums 5 and 6 are provided respectively with spur pinions 7 and 8, which, as shown, mesh with spur gears 9 and 10 respectively. The shafts of these gears 9 and 10 are journaled in one side of the case 2 and in bearing yokes 11 secured to said case. Coiled springs 12 and 13 are secured respectively to the shafts of the gears 9 and 10 and to anchoring pins 14 on the case 2, and these springs exert a winding force in a reverse direction, that is, they tend to drive the winding drums 5 and 6 in a reverse direction, so that the ends of the ribbon are kept wound up and the ribbon is drawn taut, the amount of ribbon on each drum being dependent on the action of the ribbon-feeding mechanism presently to be described.

The ribbon 3 is passed over a pair of idle guide rollers 15 located, one immediately below and the other immediately above, the sight opening 4; the said ribbon is also passed between an upper pair of feed rollers 16 and between a like lower pair of feed rollers 17, the shafts of which feed rollers are suitably journaled in the sides of the case 2. The shaft of the upper feed roller 16 is provided with a spur gear 18 and with a pair of laterally spaced small sprocket wheels or toothed sections 19. The shaft of one of the lower feed rollers 17 is provided with a spur gear 18ª and with a pair of laterally spaced small sprockets or toothed portions 19ª. Both the upper and lower sprockets 19 and 19ª engage eyelets or perforations 20 formed in the edge portions of the indicator ribbon 3, and thus prevent the slipping of the ribbon in respect to the feed rollers and insure positive movements thereof under the action of the said feed rollers.

Extending transversely through the case 2 and journaled in the sides thereof and in suitable bearings 21 secured within said case, is a two-part driving shaft 22—22ª, shown as driven by a small electric motor 23 (see Fig.

2). The motor 23 is shown as connected to the shaft section 22, and the shaft section 22ª is provided with a spur pinion 24 that meshes with a reversing gear 25 journaled on one end of a lever 26, shown as pivoted on the said shaft section 22ª. By movements of the lever 26, the reversing gear 25 may be engaged at will, either with the gear 18ª or with the gear 18ᵇ, which latter is suitably journaled in the case 2 and meshes with the gear 18. Assuming that the shaft section 22—22ª be driven in the direction of the arrow marked adjacent thereto on Fig. 3, it is evident that, when the reversing gear 25 is engaged with the gear 18ª, the ribbon will be wound onto the lower drum 5, while when the said gear 25 is engaged with the gear 18ᵇ, the ribbon will be wound onto the upper drum 6.

The above described arrangement is such that one complete rotation of the shaft section 22ª will be just sufficient to move the indicating ribbon a distance equal to the spacing between two adjacent street indications.

To impart intermittent rotations to the shaft sections 22ª at the proper times, we connect the shaft section 22—22ª by means of a one-revolution clutch, one member of which 27 is rigidly secured to the inner end of the shaft section 22 and the other section 28 of which is mounted to rotate with, but to slide on, the shaft section 22ª. A coiled spring 29 tends to hold the clutch member 28 engaged with the clutch member 27, but normally the said clutch members are held disengaged by a spring-pressed tripping plunger 30, which engages a cam flange 31 of the said clutch member 28, having, as shown, a roller 32 directly engaging the said flange. The tripping plunger 30 is mounted in a bifurcated bearing 33 secured to the back of the case 2; and a spring 34 yieldingly holds the said plunger in its operative position, shown in Figs. 2 and 3. A tripping lever 35 is intermediately pivoted to the bearing 33 and, at its inner end, is connected by a short link 36 to the upper end of said tripping plunger. The outer end of the lever 35 is equipped with an armature, that is subject to a tripping magnet 37 (see Fig. 3), shown as secured to the back of the case 2 by a bracket 38.

To positively stop the clutch member 28 at the limit of each rotation, its flange 31 is preferably provided with a notch 39, which is normally engaged by a lock plunger 40 spring-seated in a projection 41 of one of the shaft bearings 21.

At a suitable point on an overhead trolley wire 42, is a laterally off-set depending contact 43, the curved lower blade of which is narrow and is adapted to engage the central metallic portion 44 of a small secondary trolley 45, which latter is pivotally mounted on, but insulated from, one of the prongs of a pole fork or harp 46. The fork 46 is carried by the customary trolley pole 47 and is provided with the customary trolley wheel 48 that engages the wire 42. One wire 49 is electrically connected to the main trolley and extends down the trolley pole and to the car motor in the customary way. Another wire 50 is electrically connected to the intermediate portion of the secondary trolley 45, extends down the trolley pole 47 and is connected to one terminal of the tripping magnet 37. The other terminal of said magnet 37 is grounded in any suitable way, not shown, so that, whenever the live contact 43 engages the metallic central portion 44 of the secondary trolley, the magnet 37 will be energized. When the tripping magnet 37 is energized, it draws down the outer end of the lever 35 and raises the tripping plunger 30, thereby permitting the spring 29 to force the clutch member 28 into engagement with the constantly rolling clutch member 27. This will start rotation of the shaft section 22ª, and, under the rotation of the latter and of the clutch member 28, the cam flange 3 will almost immediately pass from under the end of the retracted tripping plunger 30, thus permitting the tripping plunger to be projected inward by its spring 34, so that, with the completion of the rotation of the said shaft section 22ª, it will again cam the clutch member 28 out of engagement with the continuously driven clutch member 27. This, in itself, will stop the rotation of the shaft 22ª, but to insure the stopping of the said shaft always at the same point, in its rotation, the spring-pressed lock plunger 40 reëngages with the notch 39, as already indicated.

The tripping contact 43 should, of course, be placed on the line wire at proper points to effect the change in station indications at proper times. Thus, if the different streets are all indicated, the said tripping contact should be located one block apart.

It is here important to note that the diverging groove, formed between the insulating side of the secondary trolley 45, is so narrow that, even if the main trolley wire 42 should be engaged with the said groove, it would not come in contact with the metallic central portion 44 and, hence would not cause the indicator to be operated.

The above described arrangement of the electrical tripping connections is thought to be a highly desirable one, that the same general results may be accomplished in many different ways, that is, the indicator may be tripped into action by mechanical means as well as electrical devices, and, even when the electrical trip is employed, the tripping contacts may be supported in various different ways.

The device above described is for convenience designed as a street or station indicator, but so far as our invention is concerned, it may be used for various analogous purposes, such, as, for instance, a device for successively displaying advertising matter; and, in this latter use, it may be operated either in the manner above illustrated or in various other ways.

What we claim is:

1. In a street or station indicator, the combination with ribbon holding and guiding means, of a two-part clutch, one member of which is constantly driven and the other member of which is operative on ribbon driving gears, a spring tending to engage said clutch members, a cam on the relatively movable clutch member, a lock positively holding the relatively movable clutch member against rotation when in disengaging position, a spring pressed tripping plunger normally engaging said cam and acting in conjunction therewith to disengage the clutch members and to hold the clutch members disengaged and the relatively movable member engaged with said lock, and automatic means for intermittently tripping said plunger, substantially as described.

2. In a street or station indicator, the combination with ribbon holding and guiding means, of a two-part clutch, one member of which is constantly driven and the other member of which is operative on ribbon driving gears, a spring tending to engage said clutch members, a lock positively holding the relatively movable clutch member against rotation when in disengaging position, a spring pressed tripping plunger normally holding the clutch members disengaged and the relatively movable clutch member engaged with the said lock, and automatic means for intermittently tripping said plunger, substantially as described.

In testimony whereof we affix our signatures in presence of two witnesses.

JULIUS NELSON.
MARCUS NELSON.

Witnesses:
HARRY D. KILGORE,
F. D. MERCHANT.

Copies of this patent may be obtained for five cents each, by addressing the "Commissioner of Patents, Washington, D. C."